Figure 1:
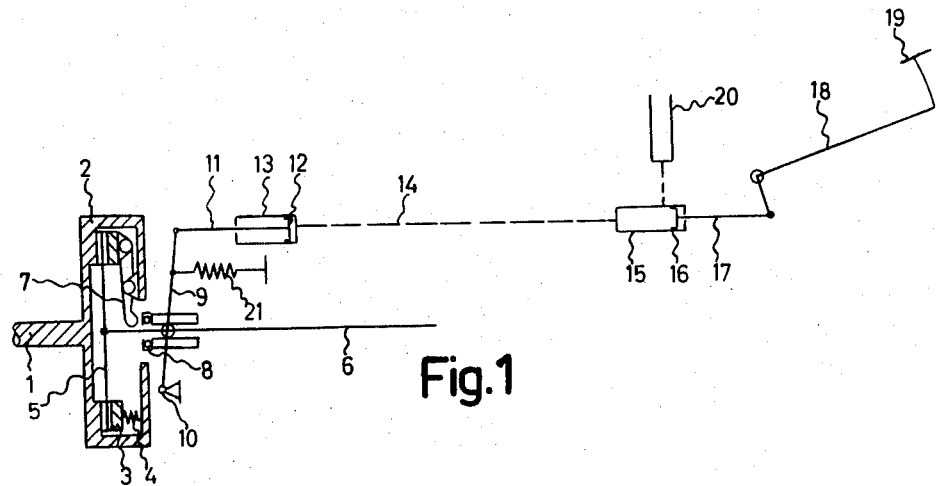

United States Patent
Persson et al.

[11] 3,756,361
[45] Sept. 4, 1973

[54] CLUTCH-RELEASE LINKAGE AUTOMATIC AXIALLY-ACTING SLACK ADJUSTER

[76] Inventors: Ronnie Persson, Rantzovgatan 2 a, 212 21 Malmo; Nils Borje Lennart Sander, Orsholmsgangen 6, 217 42 Malmo, both of Sweden

[22] Filed: Mar. 23, 1972

[21] Appl. No.: 237,260

[30] Foreign Application Priority Data
Apr. 7, 1971  Great Britain ..................... 8,939/71

[52] U.S. Cl. .......................... 192/111 A, 192/91 R
[51] Int. Cl. ............................................ F16d 13/75
[58] Field of Search ................................ 192/111 A

[56] References Cited
UNITED STATES PATENTS
2,072,010  2/1937  Moorhouse ..................... 192/111 A
2,160,752  5/1939  Oliver ............................ 192/111 A
2,680,505  6/1954  Halberg ......................... 192/111 A
3,331,476  7/1967  Livezey .......................... 192/111 X
3,502,182  3/1970  Wise ............................. 192/111 X Primary Examiner—Benjamin W. Wyche
Attorney—Laurence R. Brown

[57] ABSTRACT

An automatic slack adjuster for a clutch mechanism comprises an axially acting telescopically displaceable force transmission mechanism in the clutch actuating linkage having a screw threaded spindle with a self locking pitch for a nut thereon which has opposing clutch surfaces engaging a sleeve member movable in a housing surrounding the spindle. The nut is rotated with the sleeve and clutch surfaces to adjust the linkage after a predetermined travel distance by means of a pin extending from the housing to engage a cam slot in the sleeve, which is moved axially within the housing as a clutch engaging force is applied.

5 Claims, 4 Drawing Figures

CLUTCH-RELEASE LINKAGE AUTOMATIC AXIALLY-ACTING SLACK ADJUSTER

This invention relates to a clutch-release linkage automatic slack-adjuster of the kind (herein called "the kind defined") serving to transmit operative thrust and comprising a housing containig two relatively telescopically displaceable force-transmission rod parts of which one is a screw-threaded spindle and the other is a tubular rod part for recieving a portion of said spindle, the said spindle carrying a nut provided with a first clutch surface engageable with a corresponding clutch surface on a sleeve axially displaceable in the housing and guided for rotation by a stationary pin extending from said housing into a slot in said sleeve.

Clutch mechanisms of the type having mutually engageable friction clutch surfaces on the driving and the driven parts and in which the friction clutch surfaces are kept together by spring force are often controlled b clutch-release linkages operated by pedals, and it is necessary to afford adjustment of the linkages for correctly releasing the friction clutch surfaces from each other. Due to the high leverage in the clutch-release linkage it is desirable to initiate and accomplish the release of the clutch surfaces within a predetermined pedal stroke.

The object of the present invention is to provide an automatic slack-adjuster of the kind defined which is simple in manufacture and reliable in operation and which can be used for any one of several different tupes and sizes of clutches without substantial changes or modifications, According to the invention a slack-adjuster of the kind defined is characterised in that the said nut is provided with a second clutch surface normally engaged with a clutch surface on the said tubular rod part, the disengagement of the second clutch surfaces and the engagement of the first clutch surfaces being effected when the operative thrust overcomes the force of a spring transmitting the operative thrust.

Figure 2:
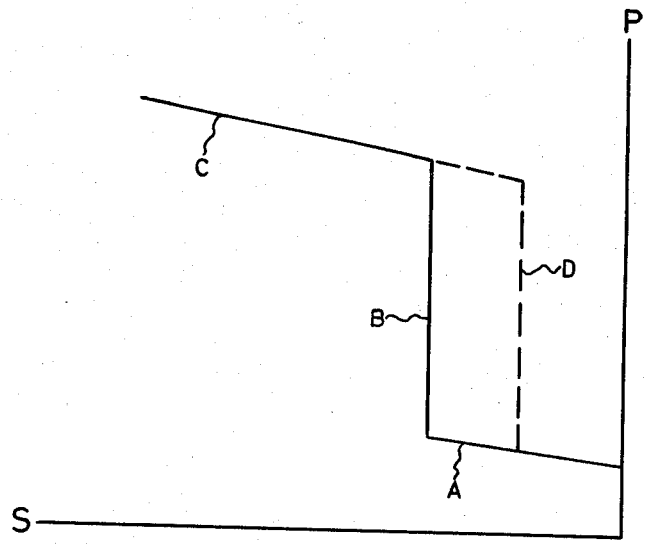
Figure 3:
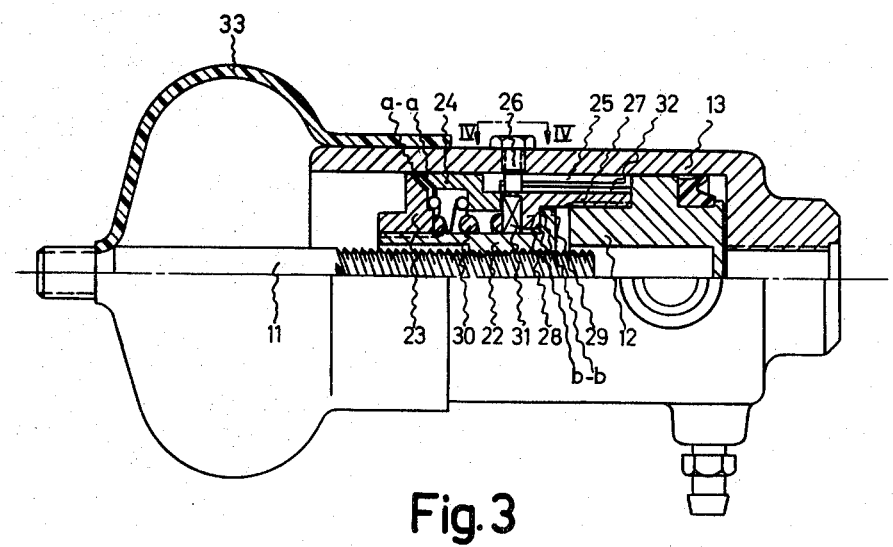
Figure 4:
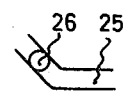

Te scope of the monopoly sought is defined in the claims hereinafter, and the invention can be put into practice by the embodiment described in more detail with reference to the accompanying drawings, in which FIG. 1 schematically shows a clutch with a clutch-rlease linkage provided with an adjuster according to the invention, FIG. 2 is a diagram showing the variations in the operative thrust transmitted in the clutch-release linkage as a function of the travel of a push rod in said linkage, FIG. 3 is an axial section through an adjuster according to the invention, and FIG. 4 is a view showing partially two co-operating elements in the adjuster of FIG. 3 as seen in the direction of the arrows IV—IV of FIG. 3.

The arrangement shown schematically in FIG. 1 comprises a driving shaft 1 rigidly connected to a friction clutch housing 2 containing a clutch ring 3 which is urged towards the left by springs 4. The clutch ring 3 frictionally engaes a clutch disc 5 which is rigidly connected to a driven shaft 6. Several two-armed radially directed levers 7 are piovtally mounted in the housing 2 and are adapted to release the ring 3 from the disc 5 against the force from the springs 4 when the inner ends of the levers 7 are displaced towards the left by a ball-bearing 8. The said ball-bearing 8 is connected to a lever 9 pivotally connected at 10 to a stationary part of a machine. The lever 9 is pivotally connected to a push rod 11 connected to a piston 12 working in a slave cylinder 13. Hydraulic fluid may be supplied through a pipe 14 connected to a master cylinder 15 in which is a piston 16 is connected to a piston rod 17 which is turn is connected to a bell-crank lever 18 provided with a pedal 19. A reservoir 20 for hydraulic fluid is connected to the cylinder 15. The slave cylinder 13 forms a housing which contains a slack-adjuster according to the invention as explained hereinafter.

In the diagram shown in FIG. 2 the abscissae are representative of the movements of the push rod 11 and the ordinates are representative of the forces transmitted through the push rod 11.

The line A shows a slight initial increase in force obtained when the pedal 19 is moved dowwardly in the first stage of a clutch releasing operation, this force being needed to overcome force derived from a return spring 21. As soon as the ball-bearing 8 contacts the levers 7 the force in the rod 11 increases rapidly as shown by the line B. The clutch ring 3 will be released from the disc 5 as soon as the force in the rod 11 overcomes the force of the springs 4; the force in the rod 11 during increase of the clutch release movement is illustrated by the line C.

As the friction clutch surfaces of the ring 3 and disc 5 and housing 2 become worn the springs 4 expand correspondingly when the friction clutch is engaged and the distance between the inner ends of the levers 7 and the ball-bearing 8 becomes smaller. If the wear becomes so great that the said distance disapperas when the friction clutch is engaged, any further wear on the coupling surfaces may make it impossible to obtain sufficient clutch-engaging force from the springs 4. An adjustment of the release linkage is desirable to restore an adequate axial distance between the ball-bearing 8 and the inner ends of the levers 7 when the friction clutch is engaged.

As shown by the dotted lines D in the diagram in FIG. 2, wear of the friction clutch surfaces will cause the force in the rod 11 to overcome the force of the strong springs 4 too early during a clutch-releasing operation.

The housing formed by the slave cylinder 13 contains a slack-adjuster which automatically adjusts the slack in the linkage and has the effect of making the rod 11 shorter in case a force overcoming the force of the springs 4 is obtained in the rod 11 after a travel of the ball-bearing 8 which is too short during a friction clutch-releasing operation.

The slack-adjuster shown in FIG. 3 comprises the housing constituted by the slave cylinder 13 (fig. 1) containing two relatively telescopically displaceable rod parts of which one is a screw-threaded spindle forming the push rod 11 and the other is a tuublar rod part constituted by the hydraulic piston 12 with a tubular element 27 movable in the cylinder 13.

The spindle push rod 11 carries a nut 22 having corresponding screw-threads, the screw-threads having such pitch as to be self-locking. The nut 22 is provided with a radially extending flange 23 having a first clutch surface adapted to co-operate with a corresponding clutch surface on a sleeve 24 movable in the housing 13, these two clutch surfaces being designated a—a and shown in their normally disengaged position. The sleeve 24 is provided with a slot 25 through which a pin 26 stationary in the housing slave cylinder 13 extends. The shape of the slot 25 is shown in FIG. 4.

The piston 12 is secured to the tubular element 27 and the latter has a radially inwardly extending flange 28, and there is a flange 29 on the nut 22. On its flange 29 the nut 22 is provided with a second clutch surface, and on the flange 28 is a corresponding clutch surface to form a clutch designated b—b. The clutch b—b is shown in its normally engaged position.

A strong compression prestressed spring 30 and a ball-bearing 31 are held between the flanges 23 and 28.

The pin 26 extends through the slot 25 into a straight groove 32 extending axially in the tubular element 27.

A rubber gasket 33 connects the spindle push rod 11 and the housing slave cylinder 13 in order to prevent entrance of dirt into the slack-adjuster.

The described slack-adjuster will operate as follows for causing a movement of the spindle push rod 11 towards the left as viewed in fIGS. 1 and FIG. 3. Such movement will restore the desired slack between the parts 7 and 8 in FIG. 1 in case the slack has become insufficient due to wear on the friction clutch surfaces of the ring 3 and disc 5.

During an operation for release of the friction clutch, fluid under pressure is introduced into the housing cylinder 13 behind the piston 12, which will move towards the left in FIG. 3. The force from the piston 12 is transmitted through the element 27, the ball-bearing 31, the spring 30, and the flange 23 to the nut 22 and further to the spindle push rod 11. The piston 12 and the spindle push rod 11 will now move in unison while the force transmitted will increase slightly due to extension of the spring 21, as indicated by the line A in the diagram of FIG. 2. During this movement the pin 26 will cause a rotation of the sleeve 24 due to the inclined shape of the initial part of the slot 25. It will be understood that said rotation will cease as soon as the travel of the piston 12 has become so long that the pin 26 has entered the following straight part of the slot 25.

In a case of insufficient slack the force transmitted will rise suddenly after an insufficient travel of the piston 12, which rise is indicated in FIG. 2 by the dotted line D. Referring to FIG. 3, such a premature increase in force will cause the spring 30 to be compressed and the first clutch a—a to be engaged and the second clutch b—b to be disengaged while the pin 26 is still in the inclined part of the slot 25 and is still causing a rotation of the sleeve 24.

The flange 23 and thus the nut 22 will now be rotated in such direction as to be displaced towards the left relative to the rod 11.

Thus the rod 11 is telescopically displaced within the tubular element 27, and thereby there is a reduction of the effective length of the rod 11 and this serves to restore the slcak in the friction clutch release linkage.

The engagement of the first clutch a—a is effected when the operative thrust overcomes the force of the spring 30 transmitting the operative thrust, and if this occurs prematurely there will be an automatic adjustment of the slack as just explained.

During the following return movement of the movable parts shown in FIG. 3 the pin 26 wwll not enter the inclined part of the slot 2 until the transmitted force has decreased to such value that the first clutch a—a has been disengaged. Thus the nut 22 will not take part in the final rotation of the sleeve 24 caused by the pin 26 during the last part of the return piston stroke.

The flange 28 on the tubular rod part remains clamped between the flange 29 on the nut 22 and the anti-friction bearing 31 while the operative thrust remains less than the force of the pre-stressed spring 30.

We claim:

1. For operating an axially acting clutch, an automatic slack-adjuster comprising in combination, a housing, a rod part within said housing movable axially when a clutch operating force is applied, a sleeve axially movable with said rod part, a cam surface rotating said sleeve within said housing after a predetermined axial movement, a threaded spindle with a self locking thread thereon movable from the force applied to said rod part, a nut on said spindle having a first clutch surface thereon, a mating first clutch surface on said sleeve for engaging said first clutch surface on said nut after said sleeve is moved in response to said force to thereby rotate said nut on said spindle when siad sleeve rotates, a second clutch surface on said nut, a mating second clutch surface on said rod part, prestressed spring means normally biasing and engaging the second clutch surfaces in the absence of said force being so arranged that when said force overcomes the spring bias of said prestressed spring means and moves the rod part and sleeve the second clutch surfaces become disengaged and the first clutch surfaces become engaged.

2. A slack-adjuster as defined in claim 1, wherein said rod part within said housing comprises a piston movable by said force and said housing comprises a cylinder for said piston.

3. A slack-adjuster as defined in claim 1, wherein said cam surface comprises a slot in said sleeve having an axial portion and in inclined portion and a pin in said housing engages said slot.

4. A slack-adjuster as defined in claim 1 wherein said sleeve has a flange thereof, and said rod part has a mating flange thereon to engage the flange on the sleeve to thereby limit the position of the sleeve.

5. A slack-adjuster as defined in claim 4, including an anti-friction bearing between said rod part and said prestressed spring means.

* * * * *

UNITED STATES PATENT OFFICE
CERTIFICATE OF CORRECTION

Patent No. 3,756,361　　　　　　　　Dated September 4, 1973

Inventor(s) Ronnie Person et al.

It is certified that error appears in the above-identified patent and that said Letters Patent are hereby corrected as shown below:

On the cover sheet, insert -- [73] Assignee:

Svenska Aktiebolaget Bromsregulator, Adelgatan, Malmo,

Sweden, a corporation of Sweden --.

Signed and sealed this 19th day of March 1974.

(SEAL)
Attest:

EDWARD M. FLETCHER, JR.　　　　　C. MARSHALL DANN
Attesting Officer　　　　　　　　Commissioner of Patents